United States Patent
Ruegsegger et al.

(10) Patent No.: US 9,933,242 B2
(45) Date of Patent: Apr. 3, 2018

(54) MISTAKE PROOF CONTOUR GAUGE

(71) Applicant: Goodrich Corporation, Charlotte, NC (US)

(72) Inventors: Nick Ruegsegger, Glendale, AZ (US); Helperus R. Rautenbach, Tempe, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 250 days.

(21) Appl. No.: 14/492,486

(22) Filed: Sep. 22, 2014

(65) Prior Publication Data
US 2016/0084629 A1   Mar. 24, 2016

(51) Int. Cl.
*G01B 5/20*   (2006.01)
*G01B 3/30*   (2006.01)

(52) U.S. Cl.
CPC   *G01B 5/20* (2013.01); *G01B 3/30* (2013.01)

(58) Field of Classification Search
CPC ......................................................... G01B 5/20
USPC .............. 33/561.1, 545, 546, 549, 550, 551, 33/501.05
See application file for complete search history.

(56) References Cited

U.S. PATENT DOCUMENTS

| | | | | |
|---|---|---|---|---|
| 4,103,428 A * | 8/1978 | Guzick | ..................... | G01B 5/24 33/1 BB |
| 4,268,967 A * | 5/1981 | Brana | ...................... | G01B 5/00 33/1 V |
| 4,868,992 A * | 9/1989 | Crafts | ....................... | G01B 5/24 33/533 |
| 5,473,940 A * | 12/1995 | Parker | .................... | G01B 3/166 33/558.01 |
| 5,680,709 A * | 10/1997 | Stone | ........................ | G09F 7/12 33/562 |
| 5,774,997 A * | 7/1998 | Gruen, Jr. | ................ | G01B 5/22 206/315.9 |
| 6,082,015 A * | 7/2000 | Bjorkdahl | ............. | A63B 47/008 33/501 |
| 6,209,215 B1 * | 4/2001 | Helms | .................... | G01B 5/207 33/529 |
| 6,357,282 B1 * | 3/2002 | Benjamin | ............ | A63B 47/008 73/81 |
| 6,688,015 B2 * | 2/2004 | Schroeder | ............... | F16C 41/04 206/303 |

(Continued)

FOREIGN PATENT DOCUMENTS

CN   102679848   9/2012
WO   2011036506   3/2011

OTHER PUBLICATIONS

Extended European Search Report dated Feb. 11, 2016 in European Application No. 15186245.5.

*Primary Examiner* — Yaritza Guadalupe-McCall
(74) *Attorney, Agent, or Firm* — Snell & Wilmer L.L.P.

(57) ABSTRACT

A contour gauge may include a fixture with an opening and a first contact on a surface of the fixture. A lacing fixture may be configured to at least partially cover the opening of the fixture. A second contact may be on the lacing fixture. The second contact may correspond to the first contact on the fixture. The fixture may be made from a translucent or transparent material. The first contact may be an electrical contact. The second contact may be a pressure sensitive switch. An output panel including a light may be present on the lacing fixture. The fixture may be made of polymethyl methacrylate.

15 Claims, 3 Drawing Sheets

(56) References Cited

U.S. PATENT DOCUMENTS

| | | | | |
|---|---|---|---|---|
| 7,024,787 B2* | 4/2006 | Varsell | ............... | G01B 3/14 33/547 |
| 7,578,070 B1* | 8/2009 | Lynch | ............... | G01B 3/34 33/514.1 |
| 7,845,077 B1* | 12/2010 | Alulis | ............... | A44C 9/02 264/296 |
| 8,191,276 B1* | 6/2012 | Yi | ............... | A63B 45/02 33/562 |
| 8,533,969 B2* | 9/2013 | Wang | ............... | B29C 53/18 33/1 BB |
| 8,549,765 B2* | 10/2013 | Xie | ............... | G01B 3/14 33/549 |
| 8,627,768 B2* | 1/2014 | Smith | ............... | A63B 45/02 101/35 |
| 9,032,632 B2* | 5/2015 | Durivault | ............... | G01B 3/166 33/199 R |
| 2002/0144419 A1* | 10/2002 | Schroeder | ............... | F16C 41/04 33/501.08 |
| 2008/0271333 A1* | 11/2008 | Sung | ............... | A63B 45/02 33/562 |
| 2008/0271334 A1* | 11/2008 | Sung | ............... | A63B 45/02 33/562 |
| 2010/0139108 A1* | 6/2010 | Davila | ............... | G01B 5/0004 33/605 |
| 2016/0084629 A1* | 3/2016 | Ruegsegger | ............... | G01B 3/30 33/561.1 |

* cited by examiner

MISTAKE PROOF CONTOUR GAUGE

FIELD OF INVENTION

The present disclosure relates to emergency evacuation devices, and, more specifically, to a mistake proof contour gauge for measuring packed emergency evacuation devices.

BACKGROUND OF THE INVENTION

Door mounted evacuation systems may be mounted to aircraft doors and covered by a bustle or decorative cover. A gap or clearance between the packed evacuation system and the bustle or decorative cover tends to limit interference with growth of a packed emergency evacuation slide resulting from atmospheric pressure differentials. The gap may provide space for moving parts to work within the door and tends to ensure a smooth, predictable drop of the evacuation slide from the aircraft. The gap or clearance may be within a relatively small range (e.g., 0.5 in to 1 in or 1.3 cm to 2.5 cm) so that measurement of the pack should be accurate. The pack should be in contour at every surface when installed on the aircraft with no part of the pack being out of contour and encroaching on the gap or clearance.

Grid patterned gauges may be used to measure pack sizes. However, grid shaped gauges may have gaps between points on the grid and may leave a substantial percentage of the pack unmeasured. Thus, parts of the pack directly under the grid may be measured while parts of the pack at the openings of the grid may extend out of contour beyond the grid. Furthermore, the gauges may be susceptible to human error when checking contact between a gauge and measuring surface that the gauge registers off. The human error may lead to ambiguity when interpreting contour reading results. In some instances, the gauge may be forced down with excessive force that may damage the packed evacuation slide.

SUMMARY OF THE INVENTION

In various embodiments, a contour gauge may comprise a fixture including an opening and a first contact on a surface of the fixture. A lacing fixture may be configured to at least partially cover the opening. A second contact may be on the lacing fixture and may correspond to the first contact. The fixture may be made from a translucent or transparent material. The first contact may be an electrical contact. The second contact may be a pressure sensitive switch. An output panel with an indicator may be on the lacing fixture. The indicator may be a light. The fixture may be made of polymethyl methacrylate. An output panel may be on the fixture.

In various embodiments, a fixture for measuring a packed emergency evacuation device may comprise a transparent or translucent surface configured to measure a contour of the packed emergency evacuation device. An opening may be opposite the transparent or translucent surface. A contact may be on a perimeter of the opening. A pressure sensitive switch may be on a perimeter of the opening. An output panel may be configured to indicate when the contour is within specification. The output panel may include a light. The transparent or translucent surface may be made of polymethyl methacrylate. The transparent or translucent surface may be formed into a polyhedron shape.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
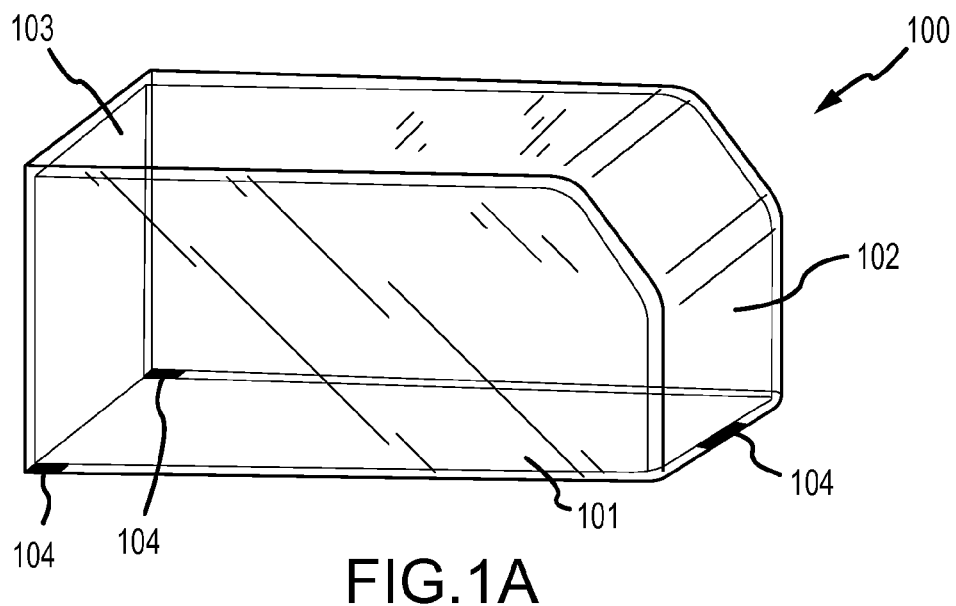
FIG. 1A illustrates a measuring fixture with continuous surfaces and electrical contacts, in accordance with various embodiments.

FIG. 1A illustrates a fixture of a contour gauge with continuous surfaces and electrical contacts, in accordance with various embodiments. Contour gauge 100 includes a fixture 102 for placement over a packed emergency evacuation device. Fixture 102 may comprise a polyhedron shape with opening 101 on one or more sides to enable placement of fixture 102 over a packed emergency evacuation device. The shape of fixture 102 may be specific to a certain type of aircraft so that an emergency evacuation device may be packed to the specific dimensions of different aircraft. Surfaces 103 may be continuous without openings in surfaces 103 where a pack may be out of contour. Surfaces 103 of fixture 102 may be rigid to limit deformation when fixture 102 is placed over a packed emergency evacuation device. Surfaces 103 of fixture 102 may be translucent or transparent to allow visual inspection of a packed emergency evacuation device through surfaces 103. Surfaces 103 may be at least one of transparent or translucent. In that regard, the phrase at least one of transparent or translucent may refer to, with respect to surfaces 103, one or more materials that transmit at least 0.5% of visible light through surfaces 103. Thus, surfaces 103 may allow visual inspection of the pack for gaps between the pack and fixture 102, or to visually see where the pack is pressing against surfaces 103 and not packed tightly enough. Fixture 102 may be made from thermoplastics such as polymethyl methacrylate (PMMA) or other translucent or transparent materials.

In various embodiments, fixture 102 may have contacts 104 around a substantially flat perimeter of opening 101. Each contact 104 may be substantially coplanar with other contacts 104 to contact a flat surface when fixture 102 is placed on the flat surface with opening 101 facing the flat surface. Contacts 104 may be flush with the perimeter of opening 101, or contacts 104 may protrude from perimeter of opening 101.

Figure 1B:
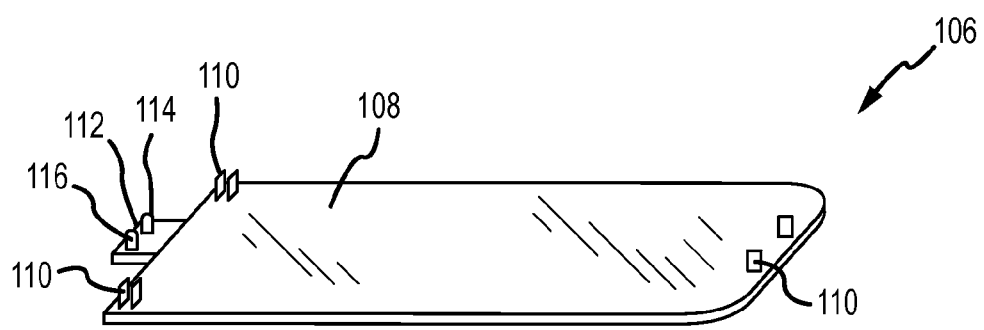
FIG. 1B illustrates a lacing fixture for use with a measuring fixture having electrical contacts, in accordance with various embodiments.

FIG. 1B illustrates a lacing fixture of a contour gauge having electrical contacts, in accordance with various embodiments. Lacing fixture 106 may serve as a surface to mate with fixture 102 of FIG. 1A for measuring a packed emergency evacuation device. Lacing fixture 106 may have surface 108 to interface with fixture 102. Surface 108 may comprise a metallic material such as aluminum, titanium or other metals, or plastics such as PMMA. Lacing fixture 106 may have contacts 110 to make an electrical connection with contacts 104 in FIG. 1A. Contacts 110 on lacing fixture 106 may correspond with locations of contacts 104 on fixture 102 so that contacts 110 and contacts 104 may complete an electrical circuit when fixture 102 is placed over and contacting lacing fixture 106.

In various embodiments, lacing fixture 106 may include an output panel 112 attached to lacing fixture 106. Output panel 112 may include indicators 114 and 116 to indicate whether fixture 102 is flat on lacing fixture 106. For example, indicator 114 may be a light, LED, or other indicator that turns on in response to all contacts 104 being in contact with contacts 110. Indicator 116 may be a light, LED, or other indicator that activates in response to one or more of contacts 104 not being in contact with contacts 110. In the foregoing example, a green light may indicate that the pack is in contour, while a red light may indicate that the pack is not within contour. Output panel 112 may be attached to fixture 102. Fixture 102 or lacing fixture 106 may include an individual output panel 112 for each contact 104 or contact 110.

Figure 1C:
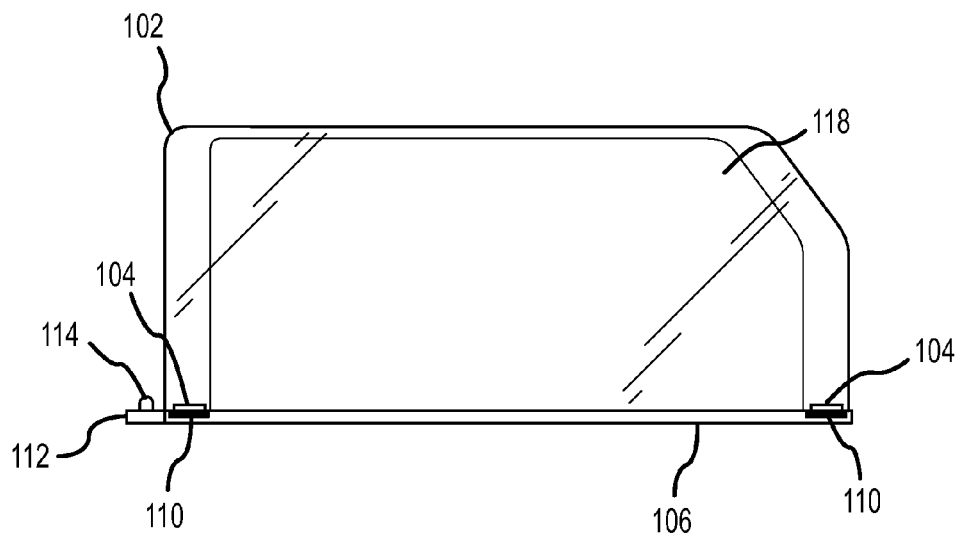
FIG. 1C illustrates a mistake proof contour gauge measuring a packed emergency evacuation device in contour, in accordance with various embodiments.

FIG. 1C illustrates the mistake proof contour gauge including fixture 102 and lacing fixture 106 measuring a packed emergency evacuation device in contour, in accordance with various embodiments. Fixture 102 may be placed over packed emergency evacuation device 118 on lacing fixture 106. Fixture 102 may lie with the perimeter of opening 101 flat against lacing fixture 106. Packed emergency evacuation device 118 may be inside of fixture 102 for measurement. A pack within contour may be spaced from surfaces 103 or contacting surfaces 103 while fixture 102 lays substantially flat against lacing fixture 106 with fixture 102 placed over packed emergency evacuation device 118. Contacts 104 and contacts 110 may be electrically coupled to complete a circuit and activate indicator 114.

In various embodiments, output panel 112 may indicate that fixture 102 is flat against lacing fixture 106 with indicator 114. Visual inspection of packed emergency evacuation device 118 through surfaces 103 of fixture 102 may further indicate that packed emergency evacuation device 118 is packed within contour. In various embodiments without contacts 104 and contacts 110 or output panel 112, visual inspection while fixture 102 lay flat over lacing fixture 106 may be the only indication that packed emergency evacuation device 118 is packed within contour.

Figure 1D:
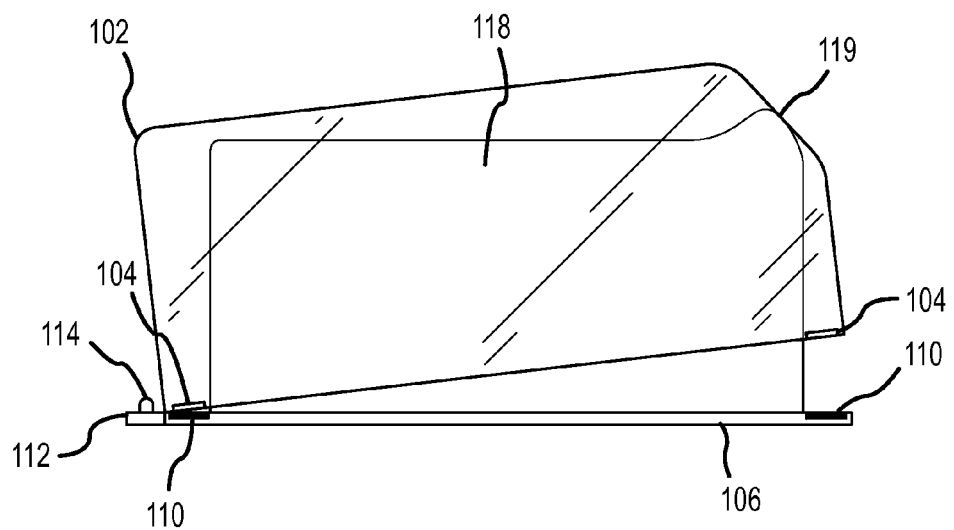
FIG. 1D illustrates the mistake proof contour gauge measuring a packed emergency evacuation device not in contour, in accordance with various embodiments.

FIG. 1D illustrates the mistake proof contour gauge including fixture 102 and lacing fixture 106 indicating that packed emergency evacuation device 118 not in contour, in accordance with various embodiments. Packed emergency evacuation device 118 may be placed on lacing fixture 106. Fixture 102 may be placed over packed emergency evacuation device 118 but may not sit flat on lacing fixture 106. One or more contacts 104 on fixture 102 may not contact the corresponding contact 110 on lacing fixture 106. Fixture 102 may be pressed against lacing fixture 106 with a weight to press down packed emergency evacuation device 118. Protruding portion 119 of packed emergency evacuation device 118 may press against fixture 102 to prevent fixture 102 from lying completely flat against lacing fixture 106. Output panel 112 may indicate that fixture 102 is not flat against lacing fixture 106. Upon visual inspection, protruding portion 119 of packed emergency evacuation device 118 may be identified as a problem area on packed emergency evacuation device 118 and signal a need to repack packed emergency evacuation device 118.

Figure 2A:
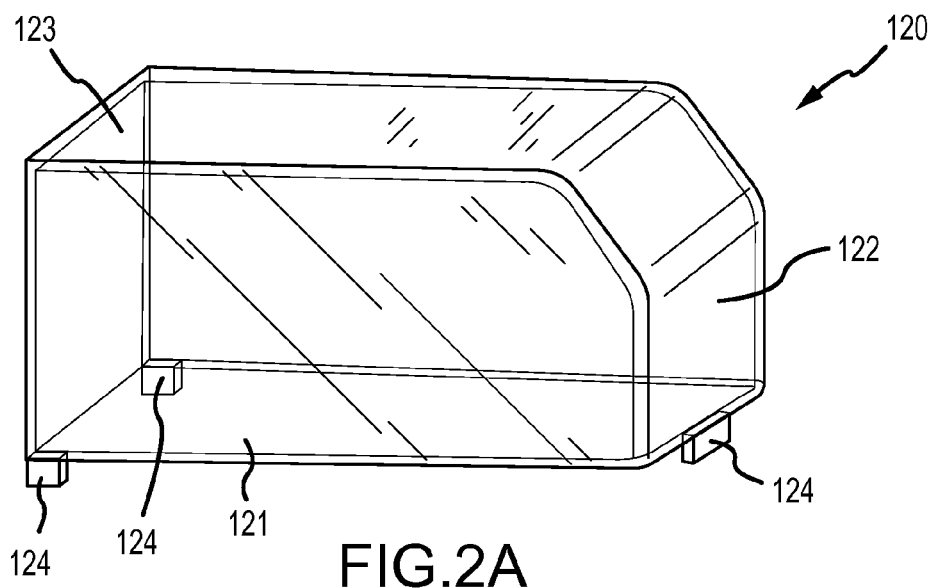
FIG. 2A illustrates a measuring fixture with continuous surfaces and protruding contacts to interact with a switch, in accordance with various embodiments.

FIG. 2A illustrates a contour gauge with continuous surfaces and contacts to activate pressure sensitive switches, in accordance with various embodiments. Contour gauge 120 includes a fixture 122 for placement over a packed emergency evacuation device. Fixture 122 may comprise a polyhedron shape with opening 121 on one or more sides to enable placement of fixture 122 over a packed emergency evacuation device. The shape of fixture 122 may be specific to a certain type of aircraft so that an emergency evacuation device may be packed to the specific dimensions of various aircraft. Surfaces 123 of fixture 122 may be rigid to limit deformation when fixture 122 is placed over a packed emergency evacuation device. Surfaces 123 of fixture 122 may be at least one of translucent or transparent to allow visual inspection of a packed emergency evacuation device through surfaces 123. Surfaces 123 may allow visual inspection of the pack for gaps between the pack and fixture 122, or to visually see where the pack is pressing against surfaces 123 and not packed to contour. Fixture 122 may be made from thermoplastics (e.g., PMMA) or other materials that are at least one of translucent or transparent.

In various embodiments, fixture 122 may have contacts 124 around a substantially flat perimeter of opening 121. Each contact 124 may protrude from the perimeter of opening 121. Fixture 122 may be placed on a flat surface with opening 121 facing the flat surface so that contacts 124 are on the surface. Contacts 124 may comprise a pressure sensitive switch, for example, to indicate that contacts 124 are pressed against a flat surface. Contacts 124 may comprise stand offs, for example, to interface with an electronic switch responsive to pressure (e.g., a push button switch, tactile switch, pressure switch, or other switch suitable for activating when pressure is applied at an input surface) on a flat surface or interlock with a groove on an otherwise flat surface.

Figure 2B:
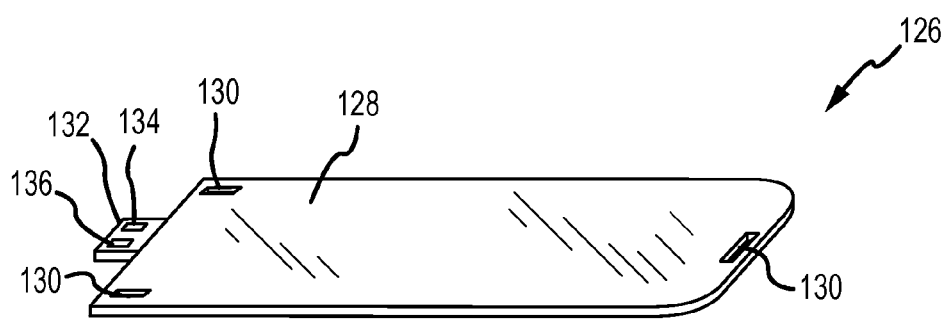
FIG. 2B illustrates a lacing fixture for use with a measuring fixture having protruding contacts, in accordance with various embodiments.

FIG. 2B illustrates a lacing fixture for use with a contour gauge having contacts to interact with contacts 130, in accordance with various embodiments. Lacing fixture 126 may serve as a surface to measure from using fixture 122 of FIG. 1A. Lacing fixture 126 may include a surface 128 to interface with fixture 122. Surface 128 of lacing fixture 126 may be a metallic material such as aluminum, titanium or other metals, or plastics such as PMMA. Lacing fixture 126 may have contacts 130 to interface with contacts 124 in FIG. 1A. For example, contacts 130 may be pressure sensitive switches or grooves to interlock with contacts 124. Contacts 130 on lacing fixture 126 may correspond with locations of contacts 124 on fixture 122 so that contacts 130 and contacts 124 may interact with contacts 130. For example, the contacts 124 may be stand offs to depress contacts 130, which may be pressure sensitive switches, and complete an electrical circuit when fixture 122 is placed over and contacting lacing fixture 126.

In various embodiments, lacing fixture 126 may include an output panel 132. Output panel 132 may include indicators 134 and 136 to indicate whether fixture 122 fits over a packed emergency evacuation device and is completely flat on lacing fixture 126. For example, indicator 134 may be a light, LED, or other indicator that activates in response to all of contacts 124 being in contact with contacts 130. Indicator 136 may be a light, LED, or other indicator that turns on in response to one or more of contacts 124 not being in contact with contacts 130. For example, pressure sensitive switches may depress and trigger a green light indicating that the pack is in contour or a red light may indicating that the pack is not within contour.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A contour gauge, comprising:
a measuring fixture including a first side panel, a second side panel spaced from the first side panel, an upper panel, a back panel and a front panel spaced from the back panel, the first and second side panels, the back and front panels and the upper panel arranged to provide a box-like structure having a four-sided perimeter spaced from the upper surface, the four-sided perimeter defining an opening, the measuring fixture further including
a first perimeter contact on a first side of the four-sided perimeter and
a second perimeter contact on a second side of the four-sided perimeter; and
a lacing fixture configured to at least partially cover the opening, through contact with the four-sided perimeter, the lacing fixture including
a first lacing contact configured to contact the first perimeter contact and
a second lacing contact configured to contact the second perimeter contact.

2. The contour gauge of claim 1, wherein the measuring fixture comprises at least one of a translucent material or a transparent material.

3. The contour gauge of claim 1, wherein the first contact comprises an electrical contact.

4. The contour gauge of claim 1, wherein the second perimeter contact comprises a pressure sensitive switch.

5. The contour gauge of claim 1, further comprising an output panel on the lacing fixture including an indicator.

6. The contour gauge of claim 5, wherein the indicator comprises at least one of a light bulb and an LED.

7. The contour gauge of claim 1, wherein the measuring fixture comprises polymethyl methacrylate.

8. The contour gauge of claim 1, further comprising an output panel on the measuring fixture.

9. A fixture for measuring a contour of a packed emergency evacuation device, comprising:
a multi-sided structure having a plurality of side panels, a cover panel and an opening opposite the cover panel, the multi-sided structure defining a multi-sided perimeter opposite the cover surface and proximate the opening;

a lacing panel configured to enclose the opening through contact with the multi-sided perimeter;
a first contact positioned on the multi-sided perimeter and a second contact positioned on the lacing panel and configured for operable contact with the first contact.

10. The fixture of claim 9, further comprising a third contact positioned on the multi-sided perimeter and a fourth contact positioned on the lacing panel and configured for operable contact with the third contact.

11. The fixture of claim 9, further comprising a pressure sensitive switch positioned on the multi-sided perimeter.

12. The fixture of claim 9, further comprising an output panel configured to indicate that the contour is within specification.

13. The fixture of claim 12, wherein the output panel comprises at least one of a light bulb and an LED.

14. The fixture of claim 9, wherein the multi-sided structure comprises polymethyl methacrylate.

15. The fixture of claim 9, wherein the multi-sided structure comprises a polyhedron shape.

* * * * *